(12) United States Patent
Kita

(10) Patent No.: US 6,534,111 B1
(45) Date of Patent: Mar. 18, 2003

(54) FROZEN SUSHI INGREDIENTS FOR ROLL CORES

(76) Inventor: Yoji Kita, 3-16-13-201, Toyocho, Koto-ku, Tokyo 135-0016 (JP)

( * ) Notice: Subject to any disclaimer, the term of this patent is extended or adjusted under 35 U.S.C. 154(b) by 220 days.

(21) Appl. No.: 09/693,931

(22) Filed: Oct. 23, 2000

(51) Int. Cl.[7] ................................................. A22C 25/00

(52) U.S. Cl. ....................... 426/643; 426/512

(58) Field of Search ............................... ; 426/643, 512; D1/102, 103, 105; A23L 1/10, 1/325

(56) References Cited

FOREIGN PATENT DOCUMENTS

| JP | 05-219906 | * | 8/1993 |
| JP | 10-290673 | * | 4/1998 |
| JP | 2000-217525 | * | 8/2000 |

* cited by examiner

*Primary Examiner*—Carolyn Paden
(74) *Attorney, Agent, or Firm*—Sughrue Mion, PLLC

(57) ABSTRACT

Flaked, chipped or minced raw fish is filled into a plurality of grooved segments 4 provided in a plate 2 and then is frozen to form and retain a plurality of frozen sushi ingredient bars 3 within the plate 2. In their frozen state, the frozen sushi ingredient bars 3 are used as roll cores for rolled sushi.

2 Claims, 2 Drawing Sheets

FROZEN SUSHI INGREDIENTS FOR ROLL CORES

BACKGROUND OF THE INVENTION

1. Field of the Invention

The present invention relates to ingredients for rolled sushi such as "negi-toro" (i.e., minced raw fatty tuna mixed with fine leek cut pieces) inserted at the center of rolled sushi.

2. Description of the Related Arts

Various raw fish was arranged as a roll core at the center of rolled sushi. Some of the sushi gradients, e.g., minced, flaked or chipped raw fish such as "negi-toro" was lengthened little by little and sandwiched at the center of sushi rice (vinegared rice). Chipped salmon, conger, etc., were also disposed little by little at the center of sushi rice to make rolled sushi.

In case of use of the minced, flaked or chipped raw fish as the roll core, making of the rolled sushi was an extremely cumbersome work. It was also difficult to finish end faces of the rolled sushi with a good appearance.

SUMMARY OF THE INVENTION

It is therefore the object of the present invention to provide a frozen sushi ingredient for roll cores ensuring a hygienic and easy making of rolled sushi with clean end faces and a good appearance.

According to an aspect of the present invention there is provided a frozen sushi ingredient for roll cores, comprising a plate including a plurality of elongated grooved segments which are formed in parallel; and a plurality of frozen sushi ingredient bars composed of flaked, chipped or minced raw fish which is filled into the plurality of grooved segments and frozen for retainment within the plate, the plurality of frozen sushi ingredient bars being intactly used as roll cores for sushi.

Preferably, the opened top side of the plate is covered with a transparent film.

The plurality of grooved segments and the plurality of frozen sushi ingredient bars may each have a square section.

BRIEF DESCRIPTION OF THE DRAWINGS

The above and other objects, aspects, features and advantages of the present invention will become more apparent from the following detailed description when read in conjunction with the accompanying drawings, in which.

DESCRIPTION OF THE PREFERRED EMBODIMENT

The present invention will now be described with reference to the accompanying drawings which illustrate a presently preferred embodiment thereof in a non-limitative manner.

Figure 1:
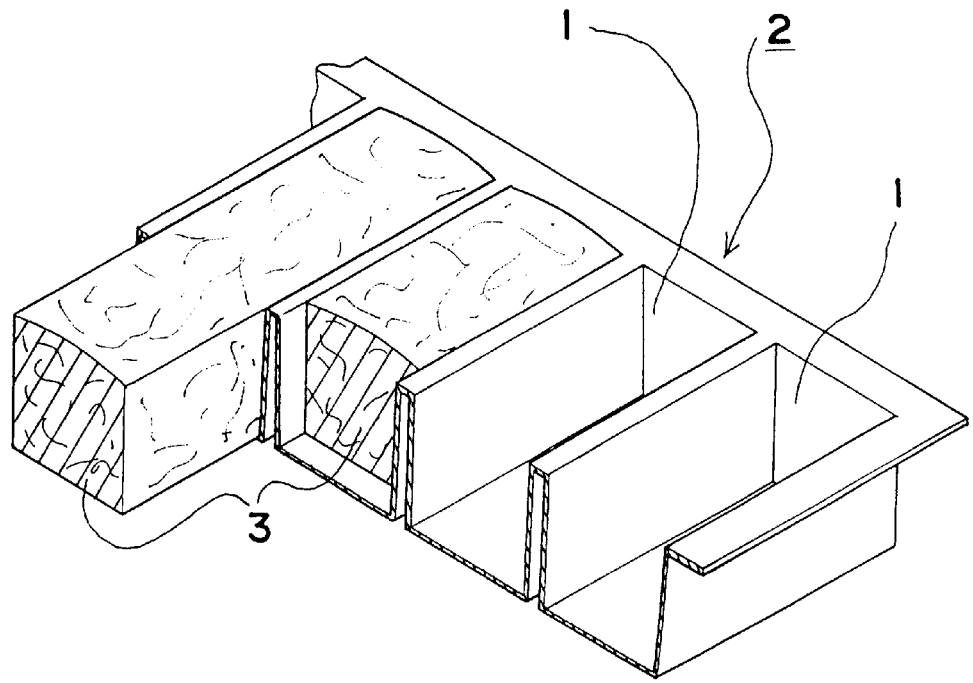
FIG. 1 is a perspective fragmentary view of the major part of a frozen sushi ingredient for roll cores in accordance with the present invention.
Figure 2:
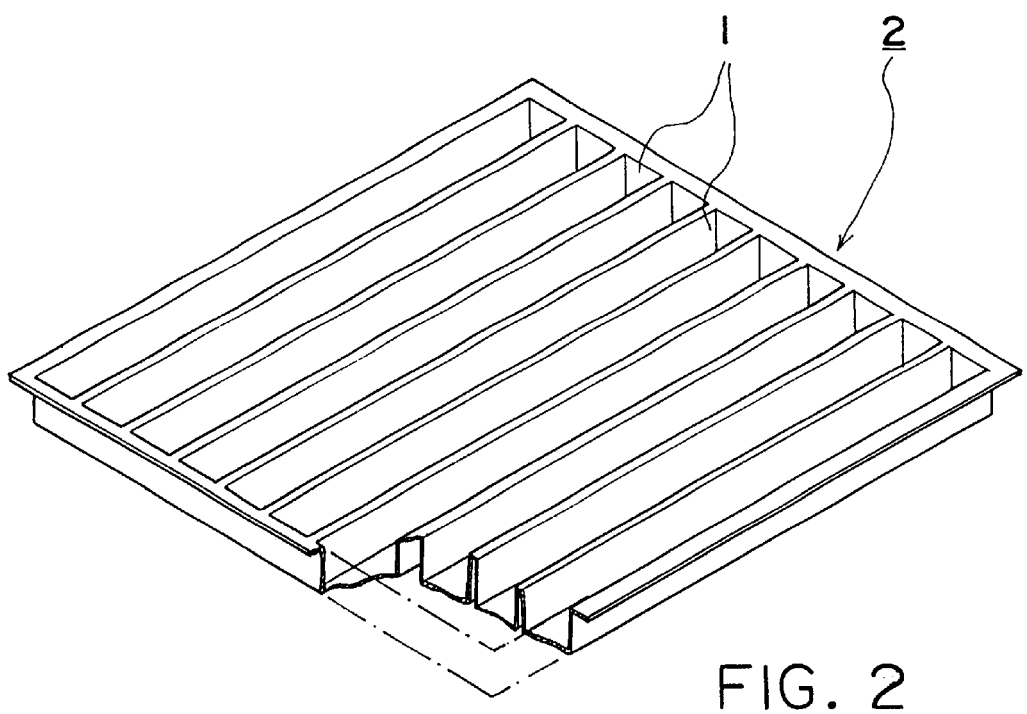
FIG. 2 is a partly cut-away perspective view of a plate for accommodating the frozen sushi ingredient.
Figure 3:
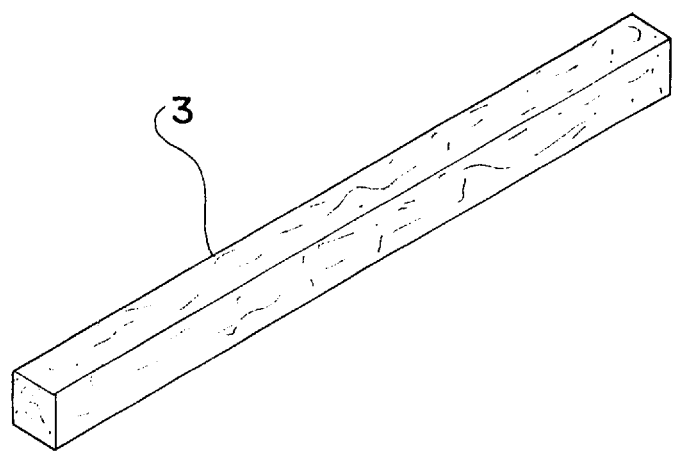
FIG. 3 is a schematic perspective view of a frozen sushi ingredient bar in accordance with the present invention.
Figure 4:
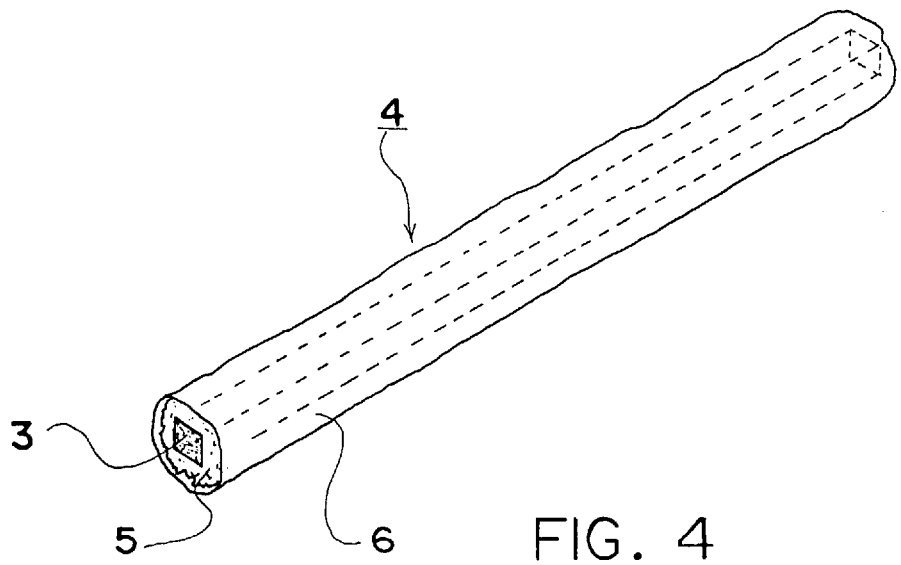
FIG. 4 is a perspective view of a rolled sushi using a frozen sushi ingredient bar in accordance with the present invention.

FIG. 1 is a perspective fragmentary view of the major part of a frozen sushi ingredient for roll cores in accordance with the present invention; FIG. 2 is a partly cut-away perspective view of a plate 2 for accommodating the frozen sushi ingredient; FIG. 3 is a schematic perspective view of a frozen sushi ingredient bar thereof; and FIG. 4 is a perspective view of a rolled sushi 4 using a frozen sushi ingredient bar 3.

As shown in FIG. 1, the frozen sushi ingredient for roll cores comprises the plate 2 and frozen sushi ingredient bars 3 each accommodated in a plurality of grooved segments 1 of the plate 2. The plate 2 is a molded part of a thin plastic material such as polypropylene and, as shown in FIG. 2, includes a multiplicity of, relatively elongated grooved segments 1 which are arranged in parallel.

Such a plate 2 can be manufactured by press molding various rigid plastic films by use of a mold and forming a slightly flanged portion on the periphery, with inward bends to form a multiplicity of partitions. By way of example, each grooved segment 1 of the plate 2 may have a 1 to 2 cm square section, and preferably has a length on the order of 15 to 20 cm.

Figure 5:
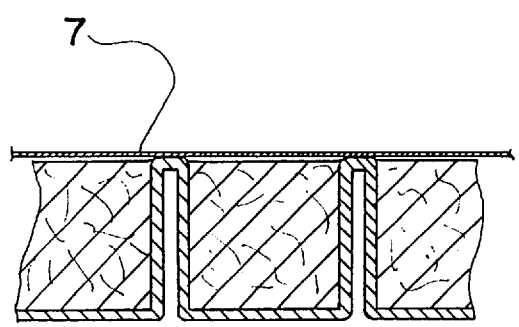
FIG. 5 is a cross-sectional view of the major part of another frozen sushi ingredient in accordance with the present invention.

The frozen sushi ingredient bars 3 are then produced by filling each grooved segment 1 of the plate 2 with minced "toro" (fattytuna) or with chipped or flaked salmon, conger, etc., intactly or with the addition of cooking oil for liaison. At that time, it is preferred that no raw fish lies at boundaries of each grooved segment 1. Then, as it stands, or with a transparent film 7 fitted to the open side of the plate 2 as shown in FIG. 5, the plate 2 is placed in a freezer to freeze the entirety to thereby complete the making of the frozen sushi ingredient for roll cores of the present invention.

Description will then be made of a method of using the frozen sushi ingredient for roll cores.

The frozen sushi ingredient bar 3 is extracted intactly as shown in FIG. 3 from the grooved segment 1 of the plate 2. As it stands, the frozen sushi ingredient bar is disposed at the center of sushi rice on top of dried laver laid over a bamboo mat not shown. It is then rolled up to make a rolled sushi 4 as shown in FIG. 4. More specifically, the frozen sushi ingredient bar 3 is centered and surrounded by sushi rice 5 together with dried laver 6 as the outermost layer. The frozen sushi ingredient bar 3 is then cut into pieces of an appropriate length. It is then left to stand at the room temperature. As a result, the frozen sushi ingredient bar 3 is thawed and made eatable. At that time, a fresh square sushi ingredient appears at the end faces of the cut sushi pieces, whetting a consumer's appetite.

In the frozen sushi ingredient for roll cores of the present invention, the frozen sushi ingredient bars 3 are obtained by freezing flaked or otherwise processed raw fish filled into the grooved segments 1 of the plate 2 such that they are retained within the plate 2. It is thus possible to extract a required number of frozen sushi ingredient bars 3 from the grooved segments 1 and to intactly use them as sushi roll cores, thereby enabling the rolled sushi 4 to readily be made.

It is also easy to make the frozen sushi ingredient bars 3 themselves, eliminating any waste attendant on that making. Furthermore, the square frozen sushi ingredient bars appearing at the end faces of the rolled sushi may whet a consumer's appetite.

While the illustrative and presently preferred embodiment of the present invention has been described in detail herein, it is to be understood that the inventive concepts maybe otherwise variously embodied and employed and that the appended claims are intended to be construed to include such variations except insofar as limited by the prior art.

What is claimed is:

1. A frozen sushi ingredient for roll cores, comprising:

a plate including a plurality of elongated grooved segments which are formed in parallel, each of said plurality of elongated grooved segments having a square section and a length of at least 7.5 times a side of said square; and a plurality of frozen sushi ingredient bars having a square section and made of flaked, chipped or minced raw fish which is filled into said plurality of grooved segments and frozen for retainment within said plate, said plurality of frozen sushi ingredient bars being intactly used as roll cores for sushi such that each of said plurality of frozen sushi ingredient bars is positioned at the center of sushi rice.

2. The frozen sushi ingredient for roll cores according to claim 1, wherein the opened top side of said plate is covered with a transparent film.

* * * * *